US011048599B2

(12) United States Patent
Lee et al.

(10) Patent No.: US 11,048,599 B2
(45) Date of Patent: *Jun. 29, 2021

(54) TIME-BASED CHECKPOINT TARGET FOR DATABASE MEDIA RECOVERY

(71) Applicant: Oracle International Corporation, Redwood Shores, CA (US)

(72) Inventors: Jonghyun Lee, San Jose, CA (US); Yunrui Li, Fremont, CA (US); Mahesh Baburao Girkar, Cupertino, CA (US); Amrish Srivastava, San Ramon, CA (US)

(73) Assignee: Oracle International Corporation, Redwood Shores, CA (US)

( * ) Notice: Subject to any disclaimer, the term of this patent is extended or adjusted under 35 U.S.C. 154(b) by 287 days.

This patent is subject to a terminal disclaimer.

(21) Appl. No.: 16/215,046

(22) Filed: Dec. 10, 2018

(65) Prior Publication Data
US 2019/0108107 A1 Apr. 11, 2019

Related U.S. Application Data

(63) Continuation of application No. 14/270,117, filed on May 5, 2014, now Pat. No. 10,152,396.

(51) Int. Cl.
*G06F 16/00* (2019.01)
*G06F 11/00* (2006.01)
(Continued)

(52) U.S. Cl.
CPC ...... *G06F 11/2038* (2013.01); *G06F 11/1438* (2013.01); *G06F 11/1458* (2013.01);
(Continued)

(58) Field of Classification Search
CPC ............. G06F 11/2028; G06F 11/1461; G06F 11/1471; G06F 11/14; G06F 11/2076;
(Continued)

(56) References Cited

U.S. PATENT DOCUMENTS 5,280,611 A 1/1994 Mohan
5,574,897 A * 11/1996 Hermsmeier ....... G06F 11/1471
(Continued)

OTHER PUBLICATIONS

Saurabh Agarwal et al., "Adaptive Incremental Checkpointing for Massively Parallel Systems", ICS'04, Saint-Malo, Francee, Jun. 26-Jul. 1, 2004, pp. 277-286.*
(Continued)

*Primary Examiner* — Srirama Channavajjala
(74) *Attorney, Agent, or Firm* — Hickman Becker Bingham Ledesma LLP (57) ABSTRACT

A method, apparatus, and system for a time-based checkpoint target is provided for standby databases. Change records received from a primary database are applied for a standby database, creating dirty buffer queues. As the change records are applied, a mapping is maintained, which maps timestamps to logical times of change records that were most recently applied at the timestamp for the standby database. On a periodic dirty buffer queue processing interval, the mapping is used to determine a target logical time that is mapped to a target timestamp that is prior to a present timestamp by at least a checkpoint delay. The dirty buffer queues are then processed up to the target logical time, creating an incremental checkpoint. On a periodic header update interval, file headers reflecting a consistent logical time for the checkpoint are also updated. The intervals and the checkpoint delay are adjustable by user or application.

20 Claims, 5 Drawing Sheets

(51) Int. Cl.
  *G06F 11/20* (2006.01)
  *G06F 11/14* (2006.01)
  *G06F 16/10* (2019.01)
  *G06F 16/23* (2019.01)
(52) U.S. Cl.
  CPC .......... *G06F 11/2097* (2013.01); *G06F 16/10* (2019.01); *G06F 16/2322* (2019.01); *G06F 2201/80* (2013.01); *G06F 2201/82* (2013.01); *G06F 2201/835* (2013.01)
(58) Field of Classification Search
  CPC ............. G06F 11/1474; G06F 11/2005; G06F 11/2097; G06F 11/1458; G06F 11/1438; G06F 11/2038; G06F 16/2322; G06F 16/10; G06F 16/14; G06F 16/1748; G06F 16/1847; G06F 16/23; G06F 16/2255; G06F 16/235; G06F 16/2379; G06F 16/24539; G06F 12/0804; G06F 12/0866; G06F 12/0246; G06F 2201/80; G06F 2201/82; G06F 2201/835
  See application file for complete search history.

(56) References Cited

U.S. PATENT DOCUMENTS

| | | | |
|---|---|---|---|
| 5,574,902 A | 11/1996 | Josten | |
| 5,996,088 A * | 11/1999 | Frank | G06F 11/1451 714/6.12 |
| 6,351,754 B1 | 2/2002 | Bridge, Jr. et al. | |
| 6,678,704 B1 * | 1/2004 | Bridge, Jr. | G06F 11/1461 |
| 6,691,245 B1 * | 2/2004 | DeKoning | G06F 11/2028 714/15 |
| 7,409,587 B2 * | 8/2008 | Perry | G06F 11/1474 714/15 |
| 7,451,166 B2 * | 11/2008 | Damani | G06F 11/1471 |
| 7,475,230 B2 * | 1/2009 | Chou | G06F 9/384 712/228 |
| 7,640,275 B2 | 12/2009 | Bridge, Jr. et al. | |
| 7,779,295 B1 * | 8/2010 | Shah | G06F 11/1458 714/6.32 |
| 8,099,627 B1 * | 1/2012 | Shah | G06F 11/1438 714/16 |
| 8,712,970 B1 * | 4/2014 | Sim-Tang | G06F 16/20 707/672 |
| 8,768,890 B2 * | 7/2014 | Burchall | G06F 16/2358 707/649 |
| 9,189,502 B2 | 11/2015 | Panteleenko | |
| 9,767,178 B2 * | 9/2017 | Srivastava | G06F 11/2038 |
| 10,152,396 B2 * | 12/2018 | Lee | G06F 11/2097 |
| 10,642,861 B2 * | 5/2020 | Srivastava | G06F 11/14 |
| 2003/0005265 A1 | 1/2003 | Barowski | |
| 2005/0066225 A1 * | 3/2005 | Rowan | G06F 11/1469 714/5.11 |
| 2005/0210073 A1 * | 9/2005 | Oeda | G06F 11/2064 |
| 2006/0010180 A1 * | 1/2006 | Kawamura | G06F 11/2076 |
| 2006/0047925 A1 * | 3/2006 | Perry | G06F 11/1474 711/162 |
| 2007/0088912 A1 * | 4/2007 | Mukherjee | G06F 3/0656 711/112 |
| 2008/0235294 A1 | 9/2008 | Girkar | |
| 2009/0182785 A1 * | 7/2009 | Aston | G06F 11/1448 |
| 2011/0029490 A1 * | 2/2011 | Agarwal | G06F 9/467 707/684 |
| 2012/0054158 A1 * | 3/2012 | Hu | G06F 16/1748 707/692 |
| 2012/0166490 A1 | 6/2012 | Raatikka | |
| 2014/0172803 A1 | 6/2014 | Diaconu | |
| 2014/0214770 A1 * | 7/2014 | Kannan | G06F 11/1438 707/649 |
| 2014/0258223 A1 | 9/2014 | Cao | |
| 2015/0205671 A1 * | 7/2015 | Bissett | G06F 11/1484 714/15 |
| 2015/0317212 A1 | 11/2015 | Lee et al. | |

OTHER PUBLICATIONS

Haitham Akkary et al., "An Analysis of a Resource Efficient Checkpoint Architecture", ACM Transactions on Architecture and Code Optimization, vol. 1, No. 4, Dec. 2004, pp. 418-444.*
U.S. Appl. No. 14/270,117, filed May 5, 2014, Final Office Action dated Oct. 7, 2016.
U.S. Appl. No. 14/270,117, filed May 5, 2014, Interview Summary dated Sep. 14, 2016.
U.S. Appl. No. 14/270,117, filed May 5, 2014, Office Action dated Jun. 16, 2016.
Lee, U.S. Appl. No. 14/270,117, filed May 5, 2014, Notice of Allowance dated Aug. 6, 2018.
Lee, U.S. Appl. No. 14/270,117, filed May 5, 2014, Interview Summary dated Oct. 3, 2017.
Lee, U.S. Appl. No. 14/270,117, filed May 5, 2014, Decision on Appeal dated Jul. 25, 2018.
Dongho Lee et al., "Checkpointing Schemes for Fast Restart in Main Memory Database Systems", IEEE 1997, pp. 663-668.

* cited by examiner

CHANGE RECORD LOG 130

| SCN | CHANGE |
|---|---|
| 1000 | Write Data[4096] into Offset 0 of Block #111 |
| 1400 | Write Data[4096] into Offset 0 of Block #100 |
| 1410 | Write Data[4096] into Offset 0 of Block #100 |
| 1600 | Write Data[2048] into Offset 0 of Block #85 |
| 1800 | Write Data[2048] into Offset 2048 of Block #85 |
| ... | ... |
| 50000 | Write Data[4096] into Offset 0 of Block #25252 |
| ... | ... |

PHYSICAL STANDBY 150

DIRTY BUFFER QUEUES 170

DIRTY BUFFER QUEUE 172A

| DIRTY BUFFER 174A | DIRTY BUFFER 174B | DIRTY BUFFER 174C | |
|---|---|---|---|
| SCN = 1400<br>Block # = 100<br>Data[4096] = 'FOO···' | SCN = 1410<br>Block # = 100<br>Data[4096] = 'BAR···' | SCN = 50000<br>Block # = 25252<br>Data[4096] = 'PIYO···' | ··· |

DIRTY BUFFER QUEUE 172B

| DIRTY BUFFER 174D | DIRTY BUFFER 174E | DIRTY BUFFER 174F | |
|---|---|---|---|
| SCN = 1000<br>Block # = 111<br>Data[4096] = 'BAZ···' | SCN = 1600<br>Block # = 85<br>Data[4096] = 'QUX···' | SCN = 1800<br>Block # = 85<br>Data[4096] = 'QUX...HOGE...' | ··· |

FIG. 1C

| HEADER UPDATE INTERVAL 191 | TIMESTAMP TO LOGICAL TIME MAPPING 180 |
|---|---|
| 120 SECONDS | INDEX    TIMESTAMP    SCN <br> 0    2/26/2014, 6:00:00    1000 <br> 1    2/26/2014, 6:00:01    1600 <br> 2    2/26/2014, 6:00:02    1800 <br> ... <br> 60    2/26/2014, 6:01:00    50000 <br> ... <br> 120    2/26/2014, 6:02:00    100000 <br> ... <br> 3599    (NULL) |
| CHECKPOINT TIME DELAY 192 | |
| 60 SECONDS | |
| POINTER 182 | |

| PRESENT TIMESTAMP 193A <br> 2/26/2014, 6:01:00 | FILE HEADERS 195A <br> SCN = 0 | BLOCK DATA 196A <br><br> BLOCK[111] = 'BAZ···' |
|---|---|---|
| PRESENT TIMESTAMP 193B <br> 2/26/2014, 6:01:01 | FILE HEADERS 195B <br> SCN = 0 | BLOCK DATA 196B <br><br> BLOCK[111] = 'BAZ···' <br> BLOCK[100] = 'BAR···' <br> BLOCK[85] = 'QUX···' |
| PRESENT TIMESTAMP 193C <br> 2/26/2014, 6:01:02 | FILE HEADERS 195C <br> SCN = 0 | BLOCK DATA 196C <br><br> BLOCK[111] = 'BAZ···' <br> BLOCK[100] = 'BAR···' <br> BLOCK[85] = 'QUX···HOGE···' |
| PRESENT TIMESTAMP 193D <br> 2/26/2014, 6:02:00 | FILE HEADERS 195D <br> SCN = 50000 | BLOCK DATA 196D <br><br> BLOCK[111] = 'BAZ···' <br> BLOCK[100] = 'BAR···' <br> BLOCK[85] = 'QUX···HOGE···' <br> ... |

TIME →

FIG. 2

202
APPLY, FOR A STANDBY DATABASE, A PLURALITY OF CHANGE RECORDS RECEIVED FROM A PRIMARY DATABASE, THE APPLYING CREATING ONE OR MORE QUEUES OF DIRTY BUFFERS, EACH DIRTY BUFFER HAVING A LOGICAL TIME OF A CHANGE RECORD THAT WAS APPLIED INTO SAID DIRTY BUFFER

204
MAINTAIN A MAPPING FOR A PLURALITY OF TIMESTAMPS, WHEREIN EACH TIMESTAMP OF SAID PLURALITY OF TIMESTAMPS IS MAPPED TO A LOGICAL TIME OF A PARTICULAR CHANGE RECORD OF SAID PLURALITY OF CHANGE RECORDS, SAID PARTICULAR CHANGE RECORD BEING A LATEST APPLIED CHANGE RECORD FOR THE STANDBY DATABASE AS OF SAID EACH TIMESTAMP

206
USING THE MAPPING, DETERMINE A TARGET LOGICAL TIME MAPPED TO A TARGET TIMESTAMP THAT IS PRIOR TO A PRESENT TIMESTAMP BY AT LEAST A CHECKPOINT DELAY

208
CREATE A CHECKPOINT DESCRIBING ONE OR MORE DATABASE FILES OF THE STANDBY DATABASE AT A CONSISTENT LOGICAL TIME, WHEREIN THE CREATING WRITES A SET OF DIRTY BUFFERS, FROM THE ONE OR MORE QUEUES OF DIRTY BUFFERS, THAT HAVE LOGICAL TIMES UP TO THE TARGET LOGICAL TIME

TIME-BASED CHECKPOINT TARGET FOR DATABASE MEDIA RECOVERY

BENEFIT CLAIM

This application claims priority, as a continuation application, to application Ser. No. 14/270,117, filed May 5, 2014, the entire contents of which are hereby incorporated by reference as if fully set forth herein, under 35 U.S.C. § 120. The applicant(s) hereby rescind any disclaimer of claim scope in the parent application(s) or the prosecution history thereof and advise the USPTO that the claims in this application may be broader than any claim in the parent application(s).

FIELD OF THE INVENTION

The present disclosure relates to databases, and more specifically, to checkpoints for databases during media recovery.

BACKGROUND

For databases, media recovery is often an essential component to minimize potential downtime and provide the highest database availability. For databases, backups are generally scheduled periodically, with change records recorded for any database changes that occur between the backups. Besides the traditional application of restoring a failed or corrupted primary database, media recovery of database backups may also be applied to a separate database, allowing the primary database to be replicated into standby, failover, and test databases. The performance of the media recovery may thus have a direct impact on query latency and database availability.

Safeguards should be provided so that the media recovery process itself is protected from failure. For example, an unexpected crash or failure may occur during the application of change records in the media recovery process. Unless there is a prior known consistent state of the database, the media recovery process will need to restart from the beginning with the backup files. This restarting may be a very expensive operation, particularly for databases that have a large number of change records to process, as is the case for multi-node or multi-instance databases.

Periodic checkpointing may be used to safeguard the media recovery process, allowing the media recovery process to resume from the last checkpoint rather than from the backup files after a failure occurs. To minimize the amount of work that needs to be repeated, more frequent checkpoints are required. However, more frequent checkpointing incurs significant I/O and processing overhead, slowing down the media recovery process and negatively impacting database performance.

This processing overhead is especially acute when the standby database is applying redo at a high rate. For example, if the standby database has failed for a period of time and is now brought back online, it will receive and process a large batch of redo records from a primary database. The checkpointing process may consume large amounts of resources to keep up with the redo, which may starve other important processes such as a read-only standby database.

Accordingly, to spread the checkpointing load over time, incremental checkpoints can be used to continuously write dirty buffers. However, it is difficult to reliably determine an optimal resource allocation for the periodic, incremental, or periodic and incremental checkpoints. While a simple approach may adjust the checkpointing rate inversely with the apply rate, this has the undesirable effect of delaying checkpoint creation when it may be needed the most.

Based on the foregoing, there is a need for a method to provide efficient and high performance checkpointing for databases during media recovery.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

General Overview

In an embodiment, a time-based checkpoint target for media recovery is provided for standby databases. A primary database generates a plurality of change records as transactions are processed. The change records are recorded in a change record log, which is transmitted to a standby database. The standby database conducts media recovery by applying the change record log as redo records. This media recovery, as maintained by the standby, can be used to support many features such as providing a read-only standby to offload read requests from the primary database, allowing the primary database to failover in the event of a failure, or creating a test database.

To safeguard the media recovery process on the standby database, a continuous incremental checkpoint is written to storage, allowing a failed media recovery process to restart from the checkpoint rather than from the last database file backup. Non-incremental checkpoints may be also be supported by using a pending checkpoint table. As the media recovery or redo apply progresses, corresponding dirty buffers are queued in memory. To implement the time-based checkpoint targets, a timestamp mapping is maintained between system clock timestamps and logical times of applied change records in the media recovery process. The timestamp mapping is updated on a periodic basis so that adjacent timestamps in the mapping are separated by a specific periodic interval.

On an adjustable time interval, the mapping is used to determine a target logical time that is mapped to a present timestamp minus a specified checkpoint time delay, which is also fully adjustable. The dirty buffer queues are processed and flushed up to the target logical time to create an incremental checkpoint. In this manner, the incremental checkpoints follow a moving checkpoint target that is based on an adjustable delay, rather than reacting immediately to media recovery load or redo apply load. This allows the checkpointing process to be load balanced over time, keeping the standby database responsive for other processes, such as a read-only standby database.

Furthermore, a time interval between file header updates of the incremental checkpoint is also independently adjustable from the dirty buffer queue processing interval. The file headers comprise metadata for cataloging the database blocks in the checkpoint files, including a consistent logical time for the checkpoint of the standby database. The updating of file headers may incur a heavy I/O penalty, particularly for large databases having many database files. File headers may be need to be updated for particular database files, even if the data blocks remain unchanged since the last file header update. Additionally, file header updating is often an ideal time to carry out additional operations such as checksum calculations and other operations requiring partial or full data block scanning, placing an even heavier I/O and processor overhead burden. Thus, it may desirable to update the file headers less frequently than the dirty buffer queue processing, which is possible due to the independently adjustable time intervals. Further, by using a time based interval, I/O loads can be distributed over time, rather than incurring a heavy I/O spike in response to arbitrary events, such as reaching the end of a log file during media recovery or redo apply. In this manner, file header update I/O loads can be controlled to avoid I/O starvation of other processes, such as a read-only standby database.

Since the checkpoint time delay, the timestamp mapping update interval, the dirty buffer processing time interval, and the file header update time interval are all fully adjustable, checkpoints can be configured according to application and/or customer requirements. To prioritize for a shorter recovery time from failure, the time delay may be reduced and/or the intervals may be shortened. On the other hand, to prioritize for reduced overhead and greater storage efficiency, the time delay may be increased and/or the intervals may be lengthened. The time delay and/or the intervals can also be adjusted by analyzing temporal data access patterns to avoid unnecessary processing of hot data. Since the time-based checkpoint follows a moving checkpoint target that is based on an adjustable delay, the checkpointing load can be smoothly distributed over time to reduce the effects of apply rate spikes on the checkpointing process. Additionally, an independent interval to update the file headers allows the I/O load to be carefully controlled. Optionally, the checkpoint processing may be further resource throttled, for example by limiting processor usage. In this manner, the checkpointing process is carefully controlled to conserve resources for other processes, such as a read-only standby database.

Database Systems

Embodiments of the present invention are used in the context of DBMSs. Therefore, a description of a DBMS is useful.

A DBMS manages one or more databases. A DBMS may comprise one or more database servers. A database comprises database data and a database dictionary that are stored on a persistent memory mechanism, such as a set of hard disks. Database data may be stored in one or more data containers. Each container contains records. The data within each record is organized into one or more fields. In relational DBMSs, the data containers are referred to as tables, the records are referred to as rows, and the fields are referred to as columns. In object-oriented databases, the data containers are referred to as object classes, the records are referred to as objects, and the fields are referred to as attributes. Other database architectures may use other terminology.

DBMSs are often protected using replication. Typically, one DBMS maintains the primary copy of a database and another database system, referred to herein as a standby database, maintains a replica of the primary copy. The standby database system is used to back up (or mirror) information stored in the primary database system or other primary copy.

For a DBMS protected using replication, data files, redo log files and control files are stored in separate, logically or physically identical images on separate physical media. In the event of a failure of the primary database system, the information is preserved, in duplicate, on the standby database system, which can be used in place of the primary database system.

The standby database system is kept up to date to accurately and timely reproduce the information in the primary database system. Typically, archived redo log records ("redo records") are transmitted automatically from the primary database system to the standby database system. Information from the redo logs is used to replicate changes on the primary database system to the standby database system.

There are two types of standby database systems, a physical standby database system and logical standby database systems, which differ in the way they archive information. In a physical standby database system, changes are made using physical replication. Under physical replication, updates made to a data unit of contiguous storage (herein "data unit") at the primary data system are made to corresponding data unit replicas stored at the replica system. In the context of database systems, changes made to data blocks on the primary database system are replicated in replicas of those data blocks on the physical standby database system.

Another approach to replicating data is that of the logical standby database system. With the logical standby database system approach, DBMS commands that modify data on the primary system are in effect re-executed on a logical standby database system to essentially duplicate the changes made to the primary database. While executing the same DBMS commands guarantees that changes are replicated at the transactional level, the changes are not replicated at the data block level.

A database block, also referred to as a data block, is a unit of persistent storage. A database block is used by a database server to store database records (e.g. to store rows of a table, to store column values of a column). When records are read from persistent storage, a database block containing the record is copied into a database block buffer in volatile memory of a database server. A database block usually contains multiple rows, and control and formatting information, (e.g. offsets to sequences of bytes representing rows or other data structures, list of transactions affecting a row). A database block may be referenced by a database block address (DBA).

A database block is referred to as being atomic because, at least in part, a database block is the smallest unit of database data a database server may request from a persistent storage device. For example, when a database server seeks a row that is stored in a database block, the database server may only read the row from persistent storage by reading in the entire database block.

Users interact with a database server of a DBMS by submitting to the database server commands that cause the database server to perform operations on data stored in a database. A user may be one or more applications running on a client computer that interact with a database server. Multiple users may also be referred to herein collectively as a user.

A database command may be in the form of a database statement that conforms to a database language. A database language for expressing the database commands is the Structured Query Language (SQL). There are many different versions of SQL, some versions are standard and some proprietary, and there are a variety of extensions. Data definition language ("DDL") commands are issued to a database server to create or configure database objects, such as tables, views, or complex data types. SQL/WL is a common extension of SQL used when manipulating XML data in an object-relational database.

A multi-node database management system is made up of interconnected nodes that share access to the same database or databases. Typically, the nodes are interconnected via a network and share access, in varying degrees, to shared storage, e.g. shared access to a set of disk drives and data blocks stored thereon. The varying degrees of shared access between the nodes may include shared nothing, shared everything, exclusive access to database partitions by node, or some combination thereof. The nodes in a multi-node database system may be in the form of a group of computers (e.g. work stations, personal computers) that are interconnected via a network. Alternately, the nodes may be the nodes of a grid, which is composed of nodes in the form of server blades interconnected with other server blades on a rack.

Each node in a multi-node database system hosts a database server. A server, such as a database server, is a combination of integrated software components and an allocation of computational resources, such as memory, a node, and processes on the node for executing the integrated software components on a processor, the combination of the software and computational resources being dedicated to performing a particular function on behalf of one or more clients.

Resources from multiple nodes in a multi-node database system can be allocated to running a particular database server's software. Each combination of the software and allocation of resources from a node is a server that is referred to herein as a "server instance" or "instance". A database server may comprise multiple database instances, some or all of which are running on separate computers, including separate server blades.

System Overview

Figure 1A:
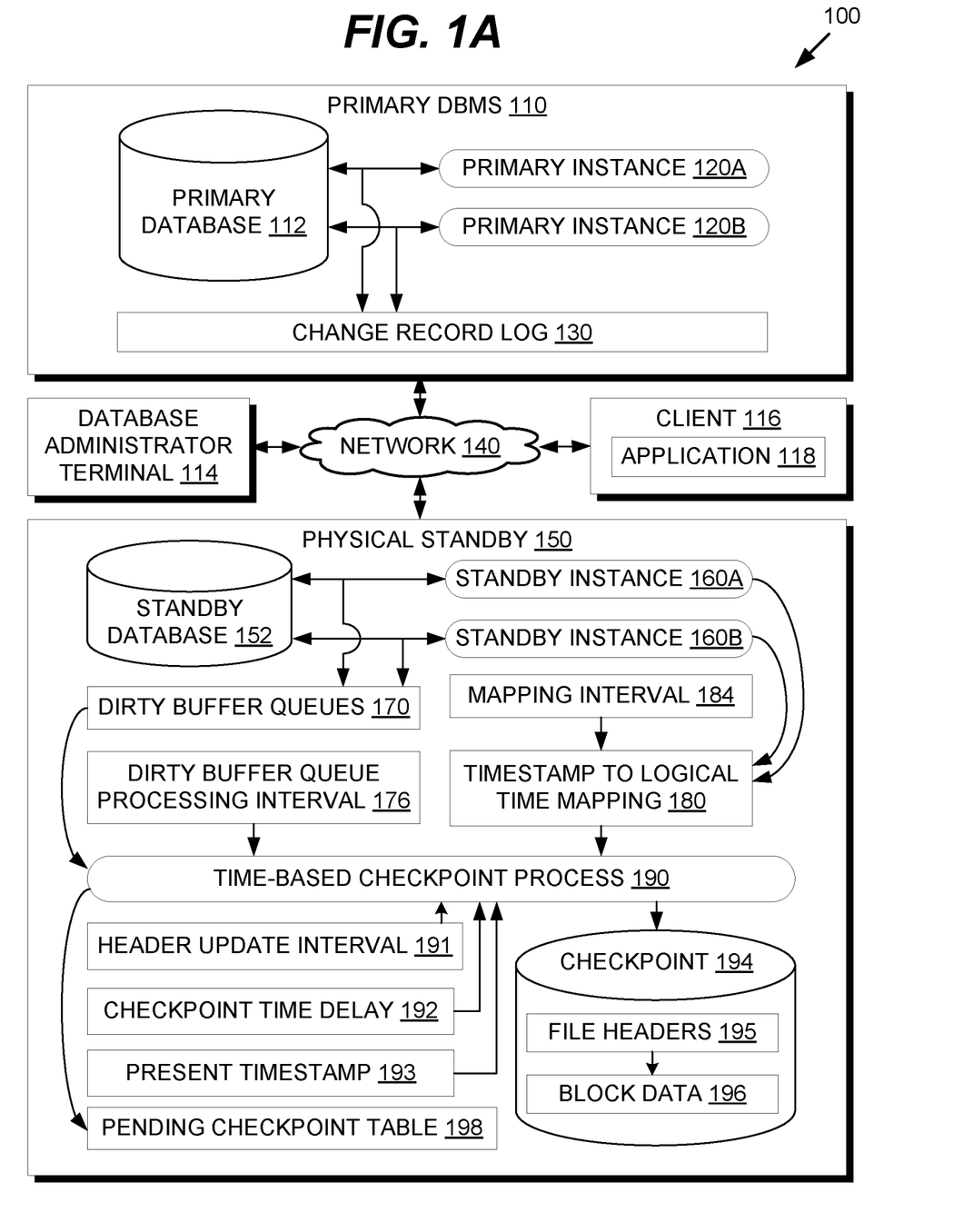
FIG. 1A is a block diagram that depicts an example physical standby executing media recovery of an example primary database system using a time-based checkpoint target, according to an embodiment.

FIG. 1A is a block diagram that depicts an example database system and an example physical standby executing media recovery of the example database system, according to an embodiment. System 100 of FIG. 1A includes primary database management system (DBMS) 110, database administrator terminal 114, client 116, network 140, and physical standby 150. Primary DBMS 110 includes primary database 112, primary instance 120A, primary instance 120B, and change record log 130. Client 116 includes application 118. Physical standby 150 includes standby database 152, standby instance 160A, standby instance 160B, dirty buffer queues 170, dirty buffer queue processing interval 176, timestamp to logical time mapping 180, mapping interval 184, time-based checkpoint process 190, header update interval 191, checkpoint time delay 192, present timestamp 193, checkpoint 194, and pending checkpoint table 198. Checkpoint 194 includes file headers 195 and block data 196.

It should be noted that FIG. 1A only shows one specific embodiment with a single primary DBMS 110, a single physical standby 150, a single network 140, and a single client 116. In other embodiments, any number of primary DBMSs, standbys, networks, and clients may be supported. While a physical standby is shown in the Figures for illustrative purposes, alternative embodiments may use one or more logical standbys. Additionally, while network 140 is shown outside of primary DBMS 110 and physical standby 150, network 140 may also encompass private intranets or other communications links within primary DBMS 110 and/or physical standby 150. Further, each primary DBMS may have any number of primary instances, and each physical standby may have any number of standby instances, which may also be dynamically added and removed during media recovery or redo apply.

As shown in FIG. 1A, primary DBMS 110 is a multi-instance or multi-node DBMS, where multiple primary instances 120A-120B are concurrently applying changes to data in primary database 112. Thus, a particular data block or block address of primary database 112 may be modified at different times by different primary instances. For the purposes of an example, primary DBMS 110 utilizes a shared everything primary database 112. Changes applied by primary instances 120A-120B are logged into change record log 130.

For example, a database application such as application 118 on client 116 may be sending transactions for processing on primary DBMS 110, which utilizes primary instances 120A-120B to apply the transactions. Change record log 130 may be created by recording changes as they are applied by primary instances 120A-120B, merged in logical time order. In an embodiment, the logical time may correspond to a logical timestamp, a non-limiting example of which is a System Commit Number (SCN). In some embodiments, the merging may occur at physical standby 150 instead. Change record log 130 may be transferred over network 140 to physical standby 150, for example by streaming new records as they are created, by pushing periodic batch updates, by pulling updates via periodic polling, or by any another method.

Physical standby 150 utilizes multiple standby instances 160A-160B to apply the records of change record log 130 into standby database 152, which can then be used to support a read-only standby database, a database failover, a test database, or other recovery applications. An example approach for such a multi-instance change record or redo record apply is described in co-pending U.S. patent application Ser. No. 14/067,129 to Srivastava et al., filed Oct. 30, 2013 and entitled "Multi-Instance Redo Apply", the entire contents of which are hereby incorporated by reference for all purposes as if fully set forth herein.

Accordingly, standby instances 160A-160B may receive and apply the changes indicated in change record log 130 to replicate primary database 112 to standby database 152. As buffers of the affected database blocks are loaded into and updated in memory, the dirty buffers may be queued into dirty buffer queues 170 for processing and flushing to disk during time-based checkpoint process 190. In some embodiments, the queues may be separate for each standby instance 160A-160B. In other embodiments, a single merged queue may be maintained.

To assist in the processing of dirty buffer queues 170 in a time-based manner, timestamp to logical time mapping 180 is maintained to keep track when particular change records, identified by their logical time, are applied with reference to system clock timestamps. To avoid the overhead of creating an entry for each and every change record, a new entry may only be entered for the latest applied change record on a periodic basis specified by mapping interval 184.

The resulting timestamp to logical time mapping 180 can then be referenced by time-based checkpoint process 190 to target a particular dirty buffer in dirty buffer queues 170 by applying checkpoint time delay 192 to present timestamp 193. On a periodic basis specified by dirty buffer queue processing interval 176, the dirty buffers in dirty buffer queues 170 are processed up to that targeted dirty buffer, which continually moves forward due to present timestamp 193 advancing with time. As a result, dirty buffers are continually written into block data 196, enabling an always-incremental checkpoint 194. At a periodic interval corresponding to header update interval 191, file headers 195 are also updated to reflect the most recent consistent state of block data 196. Header update interval 191 can be set to a value independent of dirty buffer queue processing interval 176.

As mapping interval 184, dirty buffer queue processing interval 176, header update interval 191, and checkpoint time delay 192 can all be specified and tuned by the user or database application, time-based checkpoint process 190 can be prioritized for low overhead or low recovery time from failure, depending on user and application requirements. Accordingly, a time-based checkpoint process 190 is provided that is flexibly adjustable to optimize for various database applications and business use cases.

Time-Based Checkpoint Process

Figure 2:
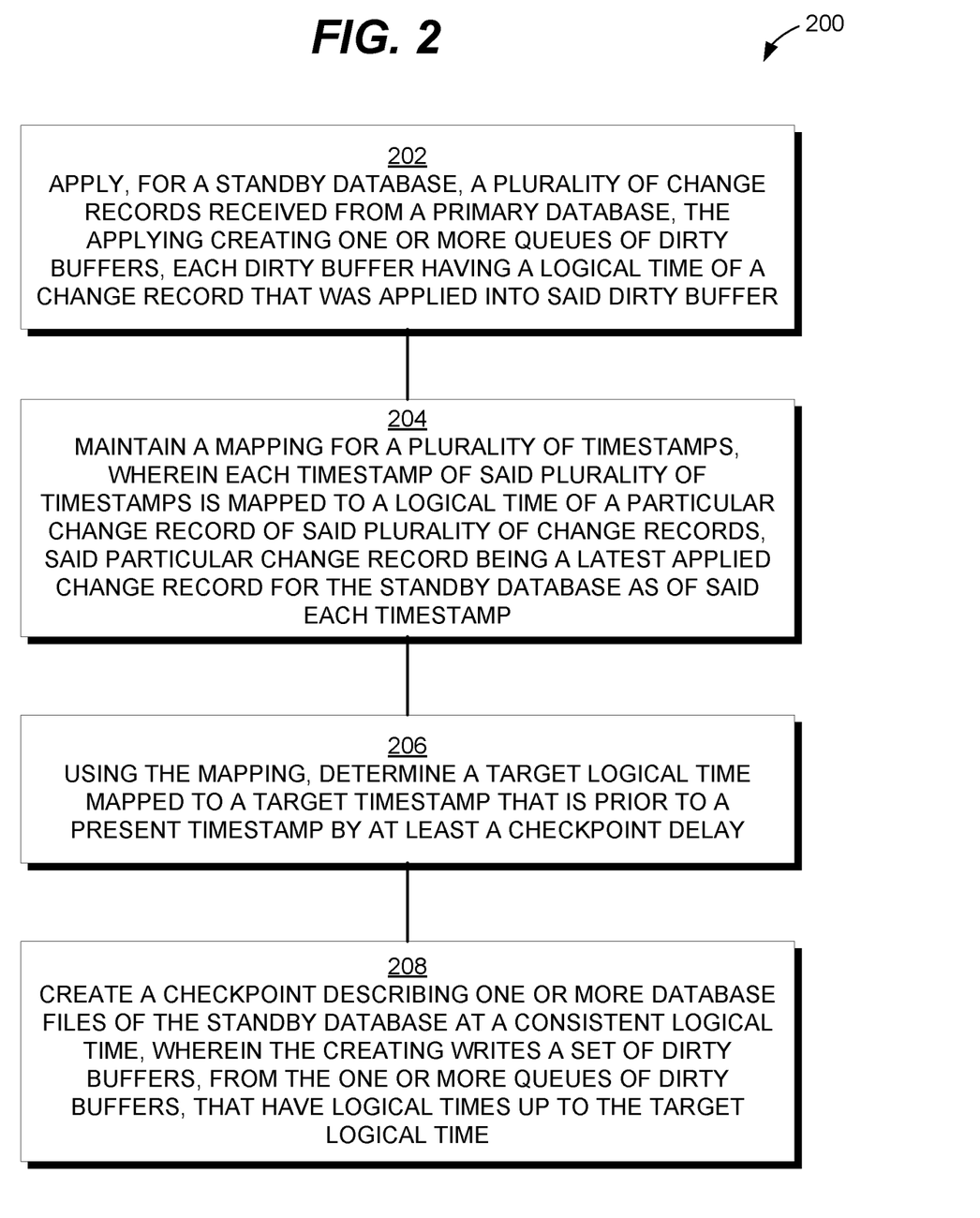
FIG. 2 is a flow diagram that depicts a process for providing a time-based checkpoint target for media recovery, according to an embodiment.

With a basic outline of system 100 now in place, it may be instructive to review a high level overview of the processing steps to provide a time-based checkpoint target for database media recovery. Turning to FIG. 2, FIG. 2 is a flow diagram that depicts a process 200 for providing a time-based checkpoint target for media recovery, according to an embodiment.

Applying the Change Records

At block 202 of process 200, referring to FIG. 1A, physical standby 150 applies a plurality of change records, or change record log 130, received from primary DBMS 110. Block 202 may begin in response to a recovery request issued on standby instance 160A, which may be manually invoked by a database administrator or automatically invoked to provide standby replication for primary DBMS 110. As the change records are applied by standby instances 160A-160B to replicate primary database 112 into standby database 152, corresponding dirty buffers are also queued into dirty buffer queues 170, wherein each dirty buffer indicates the logical time of the change record that was applied into the dirty buffer. As discussed above, in an embodiment each standby instance 160A-160B may create a corresponding dirty buffer queue, in which case two dirty buffer queues are created in dirty buffer queues 170.

Figure 1B:
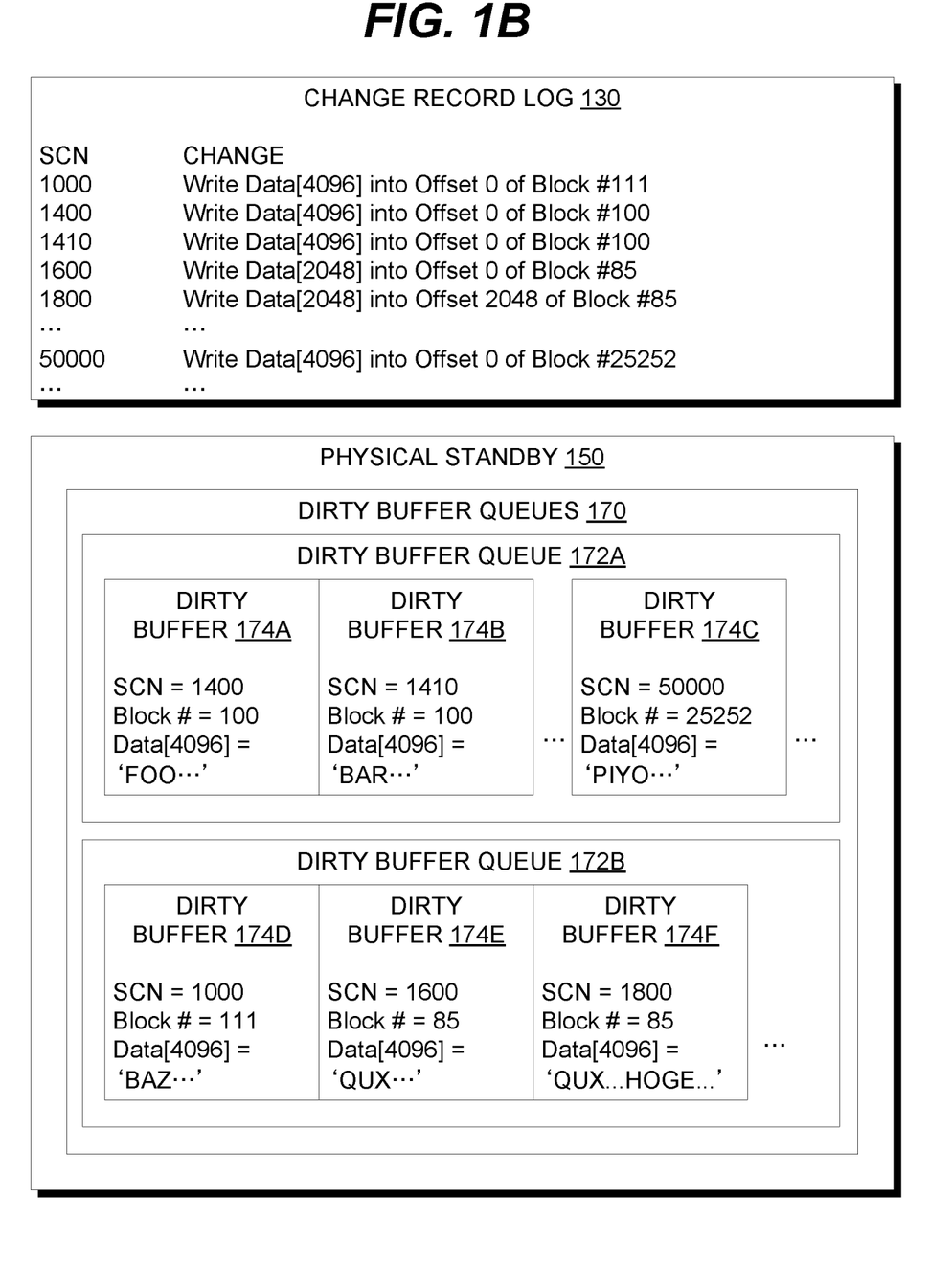
FIG. 1B is a block diagram that depicts example data structures of the example physical standby for providing a time-based checkpoint target for media recovery, according to an embodiment.

Referring to FIG. 1B, FIG. 1B is a block diagram that depicts example data structures of the example physical standby for providing a time-based checkpoint target for media recovery, according to an embodiment. FIG. 1B includes change record log 130 and physical standby 150. Physical standby 150 includes dirty buffer queues 170 and timestamp to logical time mapping 180. Dirty buffer queues 170 include dirty buffer queue 172A and dirty buffer queue 172B. Dirty buffer queue 172A includes dirty buffer 174A, dirty buffer 174B, and dirty buffer 174C. Dirty buffer queue 172B includes dirty buffer 174D, dirty buffer 174E, and dirty buffer 174F. With respect to FIG. 1B, like numbered elements may correspond to the same elements from FIG. 1A.

As shown in change record log 130, each change record may include two fields of data, including (1) a logical time (SCN) reflecting a consistent state of primary database 112 after the change record was applied, and (2) the data that was changed, which includes (a) a buffer of the data that was written (Data[ ]), (b) an offset within the database block where the write occurred (offset), and (c) a database block number (Block #) where the change occurred.

For brevity, only six change records are illustrated in change record log 130, but it may be assumed that many more change records are included that are not explicitly shown. Additionally, the database block size is set to 4 KB, or 4096 bytes, but any database block size may be utilized. Further, the specific change record structure shown in FIG. 1B is only given as an example, and any suitable structure can be used for the change records in change record log 130.

In the example shown in FIG. 1B, a simple modulo function is utilized to illustrate the distribution of change record log 130 amongst the available standby instances 160A-160B, wherein standby instance 160A may process change records addressed to an even database block number (Block # mod 2=0) and standby instance 160B may process change records addressed to an odd database block number (Block # mod 2=1). However, as discussed in the "Multi-Instance Redo Apply" application, a more intelligent distribution function may be utilized to divide the redo work amongst multiple standby instances.

Queuing Dirty Buffers

Based on the example data shown in change record log 130 and the simple modulo workload distribution function described above, applying the change records in change record log 130 will populate dirty buffer queues 170 as shown in FIG. 1B. For each change record, the appropriate standby instance 160A-160B may (1) read the change record from change record log 130, (2) retrieve the associated database block from standby database 152 if the block is not already buffered in-memory, (3) apply the changes from the change record into the buffer, and (4) queue the dirtied buffer into a respective dirty buffer queue 172A-172B.

Since standby instance 160A handles change records addressed to even Block #s, the corresponding dirty buffer queue 172A includes dirty buffers 174A, 174B and 174C, which are addressed to even Block #s 100 and 25252. On the other hand, since standby instance 160B handles change records addressed to odd Block #s, the corresponding dirty buffer queue 172B includes dirty buffers 174D, 174E and 174F, which are addressed to odd Block #s 85 and 111. Since each standby instance 160A-160B applies the relevant change records from change record log 130 in logical time (SCN) order, each dirty buffer queue 172A-172B is also queued in logical time (SCN) order. As shown in FIG. 1B, each dirty buffer 174A-174F indicates the logical time (SCN) of the change record that created the dirty buffer, the affected database block (Block #), and the full contents of the block (Data[4096]).

Maintaining the Timestamp to Logical Time Mapping

Figure 1C:
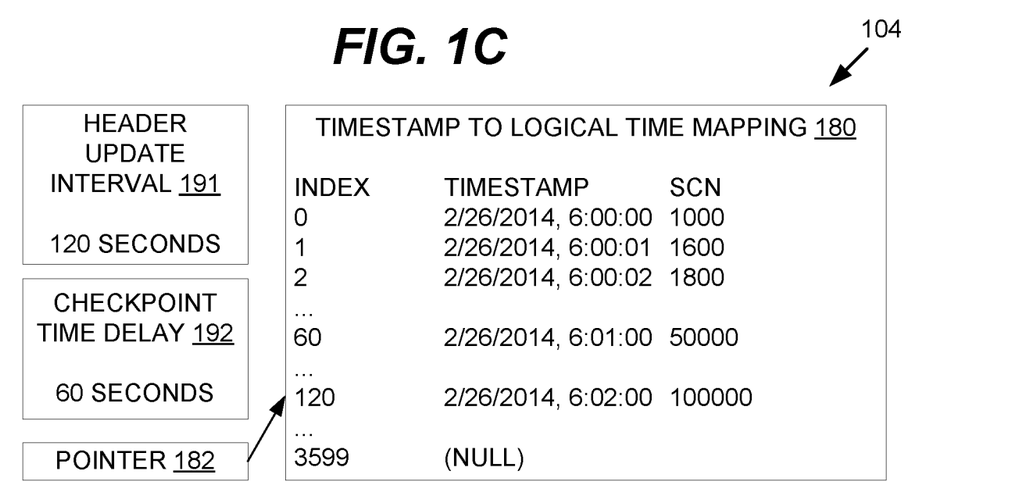
FIG. 1C is a block diagram that depicts an example timestamp to logical time mapping for providing a time-based checkpoint target for media recovery, according to an embodiment.

At block 204 of process 200, referring to FIG. 1A, physical standby 150 maintains timestamp to logical time mapping 180. Referring to FIG. 1C, FIG. 1C is a block diagram that depicts an example timestamp to logical time mapping for providing a time-based checkpoint target for media recovery, according to an embodiment. System 104 of FIG. 1C includes timestamp to logical time mapping 180, pointer 182, header update interval 191 and checkpoint time delay 192. With respect to FIG. 1C, like numbered elements may correspond to the same elements from FIG. 1A.

As previously discussed, it may be undesirable in terms of resource overhead to have mappings for every single applied change record. Accordingly, the plurality of timestamps within timestamp to logical time mapping 180 may be spaced by mapping interval 184, for example by one second, wherein a new index entry having a logical time (SCN) corresponding to the latest applied change record for standby database 152 is entered for each new one second timestamp. The example interval of one second is only an example, and any desired interval may be utilized.

Initially, timestamp to logical time mapping 180 may be empty. Each time present timestamp 193 moves forward by the desired mapping interval 184, or one second in this example, a new entry may be entered into timestamp to logical time mapping 180. Pointer 182 may keep track of the position to write the next entry. As shown in FIG. 1C, 3600 entries or an hour's worth of entries are reserved in timestamp to logical time mapping 180. However, any number of entries may be reserved. Once the final index 3599 is written, pointer 182 may wrap back to the entry at index 0, thereby implementing a circular buffer that overwrites the oldest entries to conserve memory space.

When an entry is to be written into timestamp to logical time mapping 180, pointer 182 determines the index, present timestamp 193 determines the timestamp, and dirty buffer queues 170 determines the logical time (SCN). As discussed above, the logical time (SCN) to write corresponds to the logical time (SCN) of the "latest applied change record" for standby database 152. For single-instance redo apply, the "latest applied change record" corresponds straightforwardly to the most recent dirty buffer. After the entry is populated, pointer 182 is moved forward by one entry and wrapped to index 0 if the maximum index is exceeded.

For multi-instance redo apply, the "latest applied change record" is determined by examining the progress of all standby instances as a whole for standby database 152. Since the number of change records and the apply rate may vary between the different standby instances 160A-160B, the "slowest" standby instance must be used as the baseline to determine a consistent state reflecting the global redo progress for standby database 152.

Thus, as discussed in the "Multi-instance Redo Apply" application, a multi-instance redo apply progress may be tracked using "influx logical times". In the case of dirty buffer queues 170, the local logical influx times correspond to the logical time (SCN) of the most recent dirty buffer in each of the dirty buffer queues 172A-172B. The global influx logical time corresponds to the least of the local logical influx times, representing the standby instance with the "slowest" redo apply. This global influx logical time is written into the entry for timestamp to logical time mapping 180.

To walk through an example, consider a state of dirty buffer queues 170 in FIG. 1B where only dirty buffers 174A, 174D, and 174E are present. Accordingly, the most recent dirty buffer in dirty buffer queue 172A is dirty buffer 174A, having a logical time (SCN) of 1400, and the most recent dirty buffer in dirty buffer queue 172B is dirty buffer 174E, having a logical time (SCN) of 1600. Out of 1400 and 1600, the lowest logical time (SCN) is 1400, which thus corresponds to the global influx time representing the global progress of the redo apply for standby database 152.

Since no entries have been written yet, pointer 182 may point to the entry at index 0. Present timestamp 193 may indicate the current date and time as Feb. 26, 2014, 6:00:00. Accordingly, entry 0 of timestamp to logical time mapping 180 is populated as shown in FIG. 1C. Pointer 182 is also moved forward to the entry at the next index, or index 1. This process is repeated each time present timestamp 193 moves forward by the desired mapping interval 184, or one second in this example. After pointer 182 reaches index 120, timestamp to logical time mapping 180 may be populated as shown in FIG. 1C.

Determining the Target Logical Time

Figure 1D:
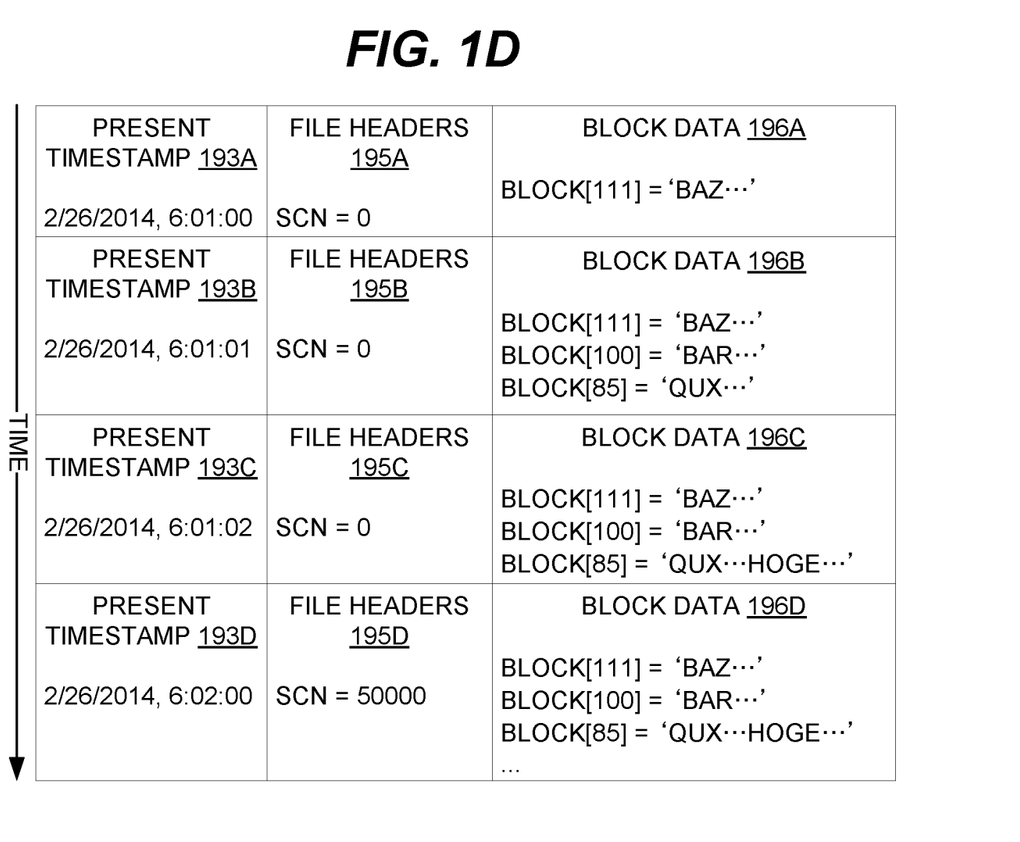
FIG. 1D is a block diagram that depicts an example checkpoint being created using a time-based checkpoint target for media recovery, according to an embodiment.

At block 206 of process 200, referring to FIG. 1A, time-based checkpoint process 190 of physical standby 150 uses timestamp to logical time mapping 180 to determine a target logical time mapped to a target timestamp that is prior to present timestamp 193 by at least checkpoint time delay 192. Referring to FIG. 1D, FIG. 1D is a block diagram that depicts an example checkpoint being created using a time-based checkpoint target for media recovery, according to an embodiment. As shown in FIG. 1D, the progress of writing data into checkpoint 194 from FIG. 1A is shown over time, with file headers 195A and block data 196A representing checkpoint 194 at present timestamp 193A, file headers 195B and block data 196B representing checkpoint 194 at present timestamp 193B, file headers 195C and block data 196C representing checkpoint 194 at present timestamp 193C, and file headers 195D and block data 196D representing checkpoint 194 at present timestamp 193D.

Starting with the time at present timestamp 193A, since checkpoint time delay 192 is specified to be 60 seconds, the target timestamp should be at least 60 seconds prior to present timestamp 193A, or 60 seconds prior to Feb. 26, 2014, 6:01:00, which corresponds to a target timestamp of Feb. 26, 2014, 6:00:00. Since pointer 182 references the entry at index 60 at present timestamp 193A, a target index having the target timestamp may be calculated by dividing checkpoint time delay 192 by the time interval between each index (60 seconds/1 second), taking the ceiling of that value (60), and finally subtracting that value from pointer 182 (60−60=0). Thus, index 0 of timestamp to logical time mapping 180 includes the target timestamp, which was created by a target change record having a target logical time or SCN equal to 1000. Thus, the target logical time is determined to be SCN 1000. If redo apply has just started and no suitable entry is available yet, then block 206 may be delayed until an old enough entry is available in timestamp to logical time mapping 180.

Flushing the Dirty Blocks

At block 208 of process 200, referring to FIG. 1A, time-based checkpoint process 190 of physical standby 150 creates checkpoint 194 describing one or more database files of standby database 152 at a consistent logical time, wherein the updating flushes or writes a set of dirty buffers, from dirty buffer queues 170, that have logical times up to the target logical time determined in block 206. Blocks 206 and 208 may repeat on dirty buffer queue processing interval 176, which in this example is 1 second, or the same as mapping interval 184, but these two intervals do not necessarily have to match.

Dirty buffer queues 170 can now be processed up to the target logical time determined in block 206, or SCN 1000. With the example shown in FIG. 1B, this only includes dirty buffer 174D, as all the other dirty buffers have a SCN that is greater than 1000. Accordingly, time-based checkpoint process 190 only processes dirty buffer 174D at present timestamp 193A, as indicated by the writing of database block #111 into block data 196A, as shown in FIG. 1D. However, if dirty buffer queues 170 did include any dirty buffers with a logical time or SCN less than 1000, then those dirty buffers would also be processed. Since dirty buffer queues 170 will be naturally sorted in logical time order due to the application of change record log 130 in logical time order, the queue processing also proceeds in logical time order and thus knows to stop after each of the dirty buffer queues 172A-172B are processed up to the target logical time, or SCN 1000.

After processing, the dirty buffers have been flushed and can be removed from their respective queues. Note that while block data 196A is shown as immediately populated with the flushed buffers, alternative embodiments may use one or more asynchronous database writer processes to coalesce I/O for greater performance. In this case, the buffers may not be written to disk immediately after flushing.

As discussed above, checkpoint 194 describes one or more database files of standby database 152 at a consistent logical time. Accordingly, file headers 195A may indicate a consistent logical time (SCN) of checkpoint 194. As shown in FIG. 1D, file headers 195A shows a default value of 0, indicating that a file header update has not yet occurred. Thus, file headers 195A may reflect a state of checkpoint 194 when created, which may have occurred when index 0 was written in timestamp to logical time mapping 180. Since header update interval 191 is set to 120 seconds as shown in FIG. 1C, the file headers may not be updated until present timestamp 193A advances to 120 seconds after index 0, or until present timestamp 193D. The updating of the file headers is described in greater detail below under the heading "UPDATING THE FILE HEADERS OF THE CHECKPOINT".

While file headers 195A only shows a latest consistent logical time (SCN) value, various metadata including data structures such as hash tables, trees, lists, bitmaps, pointers, and others may be included to catalog block data 196A. For simplicity, it is assumed that file headers 195A and block data 196A refer to a single database file. However, alternative embodiments may support multiple database files.

The above described process for blocks 206 and 208 may be repeated for present timestamps 193B, 193C, and 193D to create checkpoint 194, as reflected by file headers 195B, 195C, 195D and block data 196B, 196C, and 196D, respectively. Since the target logical time will be continuously moving forward due to the passage of time moving present timestamp 193 forward, dirty buffer queues 170 will be continually processed and written to disk, enabling checkpoint 194 to be maintained as an always-incremental checkpoint.

Note that when time-based checkpoint process 190 processes multiple dirty buffers affecting a single database block, the writing of the block data may only reflect the most recently processed dirty buffer. This is illustrated at present timestamp 193B, where time-based checkpoint process 190 processes up to SCN 1600. Database block #100 is modified by two dirty buffers 174A ('FOO . . . ') and 174B ('BAR . . . '), but block data 196B only reflects the data from the most recent dirty buffer 174B ('BAR . . . ').

Updating the File Headers of the Checkpoint

File headers 195 may be updated periodically on header update interval 191 to reflect the latest block data 196 that has been written. For example, file headers 195 may be updated with a consistent logical time (SCN) of the last applied change record that is reflected in block data 196, and pointers, offsets, data sizes, and other metadata for block data 196 may be updated in file headers 195 to correctly reference the portion of block data 196 that is in accord with the consistent logical time.

Blocks 206-208 may update block data 196 between the periodic file header updates. However, since the updated blocks are written as incremental updates, they are simply unreferenced by the metadata of file headers 195 between file header updates. In this manner, file headers 195 maintains a consistent logical time for checkpoint 194 that describes a consistent state of standby database 152, even as blocks 206-208 continuously update block data 196.

Since header update interval 191 is set to 120 seconds, present timestamp 193D represents the time when the file header update occurs after the creation of checkpoint 194. At this point in time, pointer 182 points to the entry at index 120, as shown in FIG. 1C. Since checkpoint time delay 192 is set to 60 seconds and since we are assuming that block data is written immediately to disk without any delay, blocks 206-208 will have already processed up to SCN 50000. The consistent logical time of file headers 195D is thus updated to SCN 50000, which corresponds to index 60 of timestamp to logical time mapping 180.

Time-Based Checkpoint Target Tuning

It should be noted that both header update interval 191 and checkpoint time delay 192 can be freely adjusted by the user, for example by using a command-line or graphical user interface provided by database administrator terminal 114. Thus, rather than updating file headers in response to reaching arbitrary boundaries such as at the end of a redo log file, the header update interval 191 between successive file header updates can be specified. Since file header updating incurs a heavy overhead cost, the user or database application can decide whether to favor reduced overhead with a longer header update interval 191 or reduced time from recovery with a shorter header update interval 191, depending on user and application priorities and requirements.

For example, note that the example header update interval 191, or 120 seconds, is a much larger interval than the example dirty buffer queue processing interval 176, or 1 second. As discussed above, the updating of file headers 195 may incur a heavy I/O load, particularly when standby database 152 includes many database files. For example, the file headers for certain database files may need to be updated with a consistent logical time, even if zero data block changes have been incurred since the last file header update. Thus, file header updates may update a large number of files even when database block activity is localized to a few database files. Furthermore, file header updates are often an ideal time to execute checksum calculations, consistency checks, and other operations requiring partial or full data block scanning, dramatically increasing I/O and processing overhead. Thus, it may be desirable to update the file headers less often than the dirty buffer queue processing. The tradeoff is that the recovery time from failure may be increased, as the file headers may be staler when the failure occurs.

Similarly, the checkpoint time delay 192 can be adjusted according to user and application requirements. A smaller checkpoint time delay 192 allows the checkpoint to more closely follow the redo apply, which may be an important consideration if recovery time from failure is to be minimized. However, setting the checkpoint time delay 192 too aggressively may be inefficient.

Mapping interval 184 for adding new entries in timestamp to logical time mapping 180 and dirty buffer queue processing interval 176 for processing dirty buffer queues 170 using time-based checkpoint process 190 are also adjustable by the user. As discussed above, an example interval of 1 second was used for both intervals, but any desired interval can be utilized. For example, a longer interval may be specified for dirty buffer queue processing interval 176 to avoid excessive overhead from processing hot or frequently modified data blocks.

While all of the variables described above are manually adjustable by the user, the variables may also be set partially or fully automatically by using data analysis. For example, prior database statistics may be analyzed for temporal data access patterns to tune the variables. One automated tuning target may analyze the average time period for the majority of data modifications to an average database block to set header update interval 191 just long enough to avoid unnecessary duplicate writing of hot data while still minimizing recovery time from failure.

While time-based checkpoint process 190 is already load balanced over time due to the continuous incremental writing of dirty buffers into block data 196 and the periodic updating of file headers 195, time-based checkpoint process 190 may optionally be further limited or throttled, for example by limiting processor utilization, execution time, and/or other resources. In this manner, resources can be reserved for other processes, such as a read-only standby database.

Multiple Checkpoints

While FIG. 1A only shows a single time-based checkpoint process 190, other embodiments may include multiple concurrent checkpoint processes and/or a mix of incremental and full checkpoints, which may be managed in pending checkpoint table 198 in a round-robin fashion or by another method. As discussed above, non-incremental checkpoints may be managed using pending checkpoint table 198. In this case, the progress of time-based checkpoint process 190 may be periodically evaluated, and any checkpoint jobs in pending checkpoint table 198 that have already been serviced can be removed. If a condition occurs that requires the flushing of all dirty buffers to disk, then time-based checkpoint process 190 may immediately process the most recently queued checkpoint job in pending checkpoint table 198 to empty the checkpoint queue.

Hardware Summary

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 3:
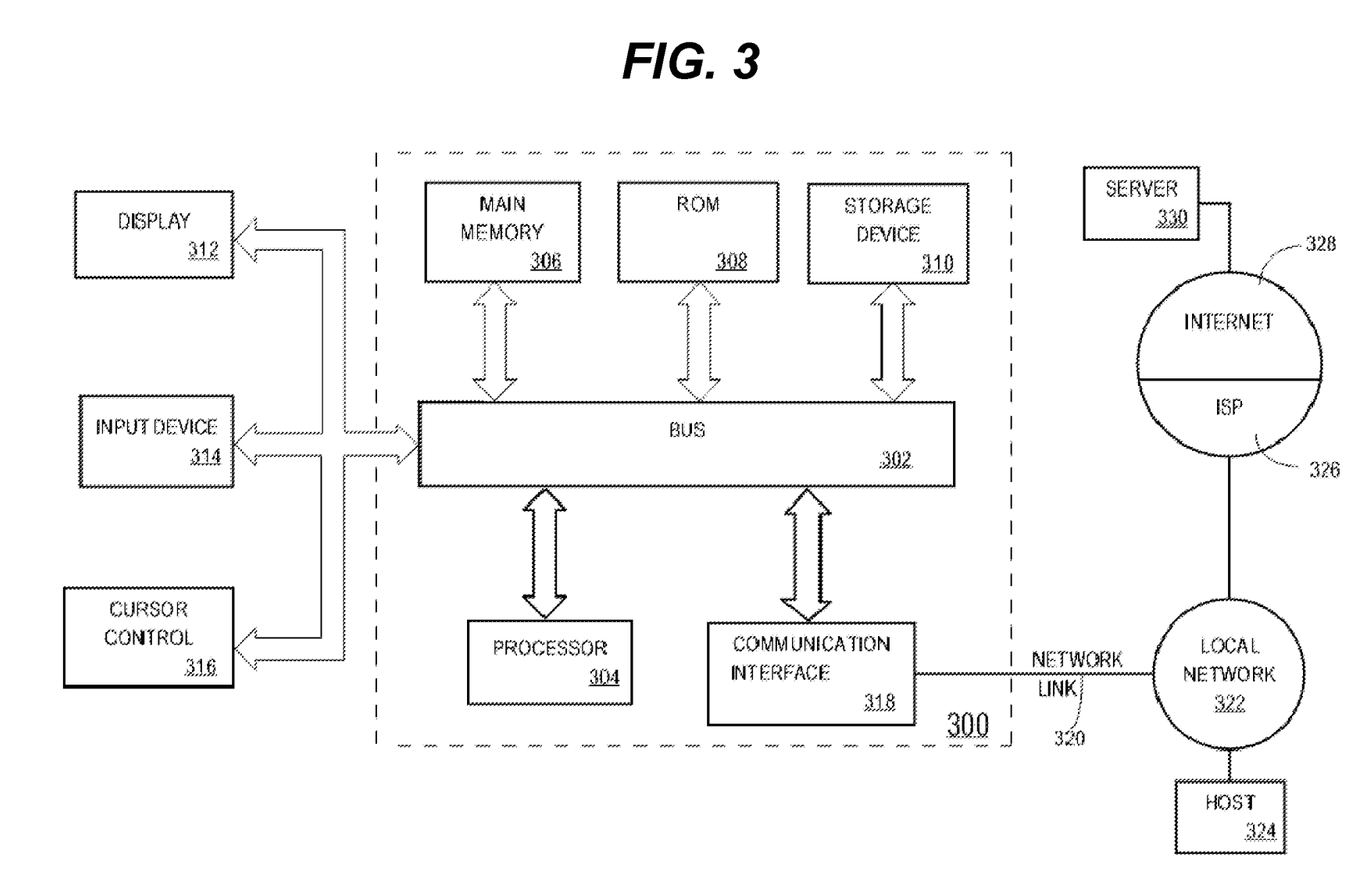
FIG. 3 is a block diagram of a computer system on which embodiments may be implemented.

For example, FIG. 3 is a block diagram that illustrates a computer system 300 upon which an embodiment of the invention may be implemented. Computer system 300 includes a bus 302 or other communication mechanism for communicating information, and a hardware processor 304 coupled with bus 302 for processing information. Hardware processor 304 may be, for example, a general purpose microprocessor.

Computer system 300 also includes a main memory 306, such as a random access memory (RAM) or other dynamic storage device, coupled to bus 302 for storing information and instructions to be executed by processor 304. Main memory 306 also may be used for storing temporary variables or other intermediate information during execution of instructions to be executed by processor 304. Such instructions, when stored in storage media accessible to processor 304, render computer system 300 into a special-purpose machine that is customized to perform the operations specified in the instructions.

Computer system 300 further includes a read only memory (ROM) 308 or other static storage device coupled to bus 302 for storing static information and instructions for processor 304. A storage device 310, such as a magnetic disk or optical disk, is provided and coupled to bus 302 for storing information and instructions.

Computer system 300 may be coupled via bus 302 to a display 312, such as a cathode ray tube (CRT), for displaying information to a computer user. An input device 314, including alphanumeric and other keys, is coupled to bus 302 for communicating information and command selections to processor 304. Another type of user input device is cursor control 316, such as a mouse, a trackball, or cursor direction keys for communicating direction information and command selections to processor 304 and for controlling cursor movement on display 312. This input device typically has two degrees of freedom in two axes, a first axis (e.g., x) and a second axis (e.g., y), that allows the device to specify positions in a plane.

Computer system 300 may implement the techniques described herein using customized hard-wired logic, one or more ASICs or FPGAs, firmware and/or program logic which in combination with the computer system causes or programs computer system 300 to be a special-purpose machine. According to one embodiment, the techniques herein are performed by computer system 300 in response to processor 304 executing one or more sequences of one or more instructions contained in main memory 306. Such instructions may be read into main memory 306 from another storage medium, such as storage device 310. Execution of the sequences of instructions contained in main memory 306 causes processor 304 to perform the process steps described herein. In alternative embodiments, hard-wired circuitry may be used in place of or in combination with software instructions.

The term "storage media" as used herein refers to any media that store data and/or instructions that cause a machine to operation in a specific fashion. Such storage media may comprise non-volatile media and/or volatile media. Non-volatile media includes, for example, optical or magnetic disks, such as storage device 310. Volatile media includes dynamic memory, such as main memory 306. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 302. Transmission media can also take the form of acoustic or light waves, such as those generated during radio-wave and infra-red data communications.

Various forms of media may be involved in carrying one or more sequences of one or more instructions to processor 304 for execution. For example, the instructions may initially be carried on a magnetic disk or solid state drive of a remote computer. The remote computer can load the instructions into its dynamic memory and send the instructions over a telephone line using a modem. A modem local to computer system 300 can receive the data on the telephone line and use an infra-red transmitter to convert the data to an infra-red signal. An infra-red detector can receive the data carried in the infra-red signal and appropriate circuitry can place the data on bus 302. Bus 302 carries the data to main memory 306, from which processor 304 retrieves and executes the instructions. The instructions received by main memory 306 may optionally be stored on storage device 310 either before or after execution by processor 304.

Computer system 300 also includes a communication interface 318 coupled to bus 302. Communication interface 318 provides a two-way data communication coupling to a network link 320 that is connected to a local network 322. For example, communication interface 318 may be an integrated services digital network (ISDN) card, cable modem, satellite modem, or a modem to provide a data communication connection to a corresponding type of telephone line. As another example, communication interface 318 may be a local area network (LAN) card to provide a data communication connection to a compatible LAN. Wireless links may also be implemented. In any such implementation, communication interface 318 sends and receives electrical, electromagnetic or optical signals that carry digital data streams representing various types of information.

Network link 320 typically provides data communication through one or more networks to other data devices. For example, network link 320 may provide a connection through local network 322 to a host computer 324 or to data equipment operated by an Internet Service Provider (ISP) 326. ISP 326 in turn provides data communication services through the world wide packet data communication network now commonly referred to as the "Internet" 328. Local network 322 and Internet 328 both use electrical, electromagnetic or optical signals that carry digital data streams. The signals through the various networks and the signals on network link 320 and through communication interface 318, which carry the digital data to and from computer system 300, are example forms of transmission media.

Computer system 300 can send messages and receive data, including program code, through the network(s), network link 320 and communication interface 318. In the Internet example, a server 330 might transmit a requested code for an application program through Internet 328, ISP 326, local network 322 and communication interface 318.

The received code may be executed by processor 304 as it is received, and/or stored in storage device 310, or other non-volatile storage for later execution.

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A method comprising:
applying, into a plurality of buffers of a standby database, a plurality of change records received from a primary database, wherein each buffer of the plurality of buffers has a respective time of a change record that was latest, of the change records in the buffer, to be applied to a primary database;
calculating, by subtracting a checkpoint delay from a present time, a target time that is before the present time;
creating a checkpoint for one or more database files of the standby database by flushing a subset of the plurality of buffers that have a respective time that is before the target time that is before the present time;
updating in the checkpoint, after said flushing at least one buffer of the subset of the plurality of buffers;
    metadata that reflects the subset of the plurality of buffers, and
    a logical time in a checkpoint file that does not contain said metadata that reflects the subset of the plurality of buffers;
wherein the method is performed by one or more computing devices.

2. The method of claim 1 wherein:
flushing the subset of the plurality of buffers comprises writing data into at least one checkpoint file that contains a file header that contains a logical time;
the subset of the plurality of buffers comprises a last buffer that has a latest respective time of the subset of the plurality of buffers;
said updating the metadata occurs after an update interval elapses and comprises replacing the logical time in the file header with the respective time of the last buffer.

3. The method of claim 2 wherein:
writing data into at least one checkpoint file comprises writing data into a subset of a plurality of checkpoint files, wherein each checkpoint file of the plurality of checkpoint files contains said file header;
said updating the logical time in the checkpoint file that does not contain said metadata that reflects the subset of the plurality of buffers comprises replacing the logical time in a file header of at least one checkpoint file of the plurality of checkpoint files that is not in said subset of the checkpoint files.

4. The method of claim 2 wherein the update interval is longer than the checkpoint delay.

5. The method of claim 2 wherein replacing the logical time in the file header comprises calculating a checksum.

6. The method of claim 2 wherein replacing the logical time in the file header comprises scanning the at least one checkpoint file.

7. The method of claim 1 wherein creating the checkpoint comprises limiting processor usage.

8. The method of claim 1 wherein:
said subset of the plurality of buffers is a first subset;
the method operates continuously and further comprises flushing a second subset of the plurality of buffers that have a respective time that is before a second present time by at least the checkpoint delay.

9. The method of claim 8 wherein flushing the first and second subsets of the plurality of buffers are temporally separated by less than the checkpoint delay.

10. The method of claim 1 wherein applying the plurality of change records into buffers of the standby database comprises:
retrieving data blocks identified by the plurality of change records;
applying the plurality of change records to the data blocks;
storing the data blocks into buffers of the standby database.

11. The method of claim 1 wherein change records received from the primary database comprises change records received from a plurality of instances of the primary database.

12. The method of claim 11 wherein:
each of the change records has a logical time;
the method further comprises sorting the change records by logical time.

13. One or more non-transitory computer-readable media storing instructions that, when executed by one or more processors, cause:
applying, into a plurality of buffers of a standby database, a plurality of change records received from a primary database, wherein each buffer of the plurality of buffers has a respective time of a change record that was latest, of the change records in the buffer, to be applied to a primary database;
calculating, by subtracting a checkpoint delay from a present time, a target time that is before the present time;
creating a checkpoint for one or more database files of the standby database by flushing a subset of the plurality of buffers that have a respective time that is before the target time that is before the present time;
updating in the checkpoint, after said flushing at least one buffer of the subset of the plurality of buffers;
metadata that reflects the subset of the plurality of buffers, and
a logical time in a checkpoint file that does not contain said metadata that reflects the subset of the plurality of buffers.

14. The one or more non-transitory computer-readable media of claim 13 wherein:
flushing the subset of the plurality of buffers comprises writing data into at least one checkpoint file that contains a file header that contains a logical time;
the subset of the plurality of buffers comprises a last buffer that has a latest respective time of the subset of the plurality of buffers;
said updating the metadata occurs after an update interval elapses and comprises replacing the logical time in the file header with the respective time of the last buffer.

15. The one or more non-transitory computer-readable media of claim 14 wherein:
writing data into at least one checkpoint file comprises writing data into a subset of a plurality of checkpoint files, wherein each checkpoint file of the plurality of checkpoint files contains said file header;
said updating the logical time in the checkpoint file that does not contain said metadata that reflects the subset of the plurality of buffers comprises replacing the logical time in a file header of at least one checkpoint file of the plurality of checkpoint files that is not in said subset of the checkpoint files.

16. The one or more non-transitory computer-readable media of claim 14 wherein the update interval is longer than the checkpoint delay.

17. The one or more non-transitory computer-readable media of claim 14 wherein replacing the logical time in the file header comprises either of:
calculating a checksum, or scanning the at least one checkpoint file.

18. The one or more non-transitory computer-readable media of claim 13 wherein:
said subset of the plurality of buffers is a first subset;
the instructions are processed continuously and further cause flushing a second subset of the plurality of buffers that have a respective time that is before a second present time by at least the checkpoint delay;
flushing the first and second subsets of buffers are temporally separated by less than the checkpoint delay.

19. The one or more non-transitory computer-readable media of claim 13 wherein applying the plurality of change records into buffers of the standby database comprises:
retrieving data blocks identified by the plurality of change records;
applying the plurality of change records to the data blocks;
storing the data blocks into buffers of the standby database.

20. The one or more non-transitory computer-readable media of claim 13 wherein:

change records received from the primary database comprises change records received from a plurality of instances of the primary database;
each of the change records has a logical time;
the instructions further cause sorting the change records by logical time.

\* \* \* \* \*

UNITED STATES PATENT AND TRADEMARK OFFICE
CERTIFICATE OF CORRECTION

PATENT NO. : 11,048,599 B2  
APPLICATION NO. : 16/215046  
DATED : June 29, 2021  
INVENTOR(S) : Lee et al.

Page 1 of 1

It is certified that error appears in the above-identified patent and that said Letters Patent is hereby corrected as shown below:

On the Title Page

In Column 2, under Other Publications, Line 2, delete "Francee," and insert -- France, --, therefor.

In the Specification

In Column 3, Line 5, after "also" delete "be".

In Column 5, Line 36, delete "SQL/WL" and insert -- SQL/XML --, therefor.

In the Claims

In Column 16, Line 65, in Claim 1, delete "buffers;" and insert -- buffers, --, therefor.

In Column 18, Line 10, in Claim 13, delete "buffers;" and insert -- buffers, --, therefor.

Signed and Sealed this  
Nineteenth Day of October, 2021

Drew Hirshfeld  
*Performing the Functions and Duties of the*  
*Under Secretary of Commerce for Intellectual Property and*  
*Director of the United States Patent and Trademark Office*